United States Patent [19]
Jones

[11] 3,789,207
[45] Jan. 29, 1974

[54] INTEGRATING CIRCUIT FOR DATA RECOVERY SYSTEM

[75] Inventor: William H. Jones, Oklahoma City, Okla.

[73] Assignee: Honeywell Information Systems Inc., Waltham, Mass.

[22] Filed: Sept. 22, 1972

[21] Appl. No.: 291,444

[52] U.S. Cl. .......... 235/183, 320/1, 328/151, 340/174.1 H
[51] Int. Cl. .......... G06g 7/18, G11b 5/02
[58] Field of Search. 235/183; 328/127, 151; 320/1; 340/174.1 H

[56] References Cited

UNITED STATES PATENTS

| | | | |
|---|---|---|---|
| 3,697,781 | 10/1972 | McLean | 328/151 |
| 3,466,434 | 9/1969 | Goldstein | 235/183 |
| 3,702,394 | 11/1972 | Rainsberger et al. | 235/183 |
| 3,636,332 | 1/1972 | Nelson et al. | 235/183 |
| 3,723,713 | 3/1973 | Banner et al. | 235/183 |

FOREIGN PATENTS OR APPLICATIONS

| | | | |
|---|---|---|---|
| 1,548,794 | 9/1969 | Germany | 328/127 |

*Primary Examiner*—Felix D. Gruber
*Attorney, Agent, or Firm*—Gerald R. Woods

[57] ABSTRACT

For use in a system which recovers data stored in a disk memory unit by (1) integrating signals over successive halves of data cells and (2) comparing the results of the integrations, an improved integrating circuit having a differential transistor amplifier driven by a single current source. Where NPN transistors are used, the collector terminals of the transistors are connected to charging capacitors and field effect transistors in parallel between the transistors and ground. To start integration, the current source is biased on and the field effect transistors are biased off. To stop integration, the current source is biased off and the field effect transistors are triggered into conduction.

8 Claims, 2 Drawing Figures

INTEGRATING CIRCUIT FOR DATA RECOVERY SYSTEM

BACKGROUND OF THE INVENTION

The present invention relates to the art of electronic data storage and more particularly to a data recovery system having improved integrating circuits.

Binary information can be stored in a standard data processing system by polarizing selected discrete spots on the surface of magnetic storage media such as disks, tapes and drums. A change in polarization or the absence of such a change in a certain surface area may be referred to as a bit. The stored information can be recovered at will by driving the media past an electromagnetic transducer. The transducer responds to polarized spots on the media surface by generating voltage pulses, referred to as read signal waveforms.

Imperfections in the media, the pattern in which binary information is stored on the media, the transducer design and the design and location of electronic circuits used to write and read the binary information are all sources of spurious signals which are referred to collectively as interference or noise. Noise signals can distort the read signal waveforms generated by the transducer.

Distortion can be crucial in data recovery systems using a peak detection scheme for sampling the waveform. A peak detection scheme is one in which the waveform is sampled at its peak, assuming the peak occurs within a fixed sampling window. In high density data recording, pulse crowding effects known as peak shifting and amplitude deterioration may cause the peak of the waveform to shift out of the sampling window or may degrade the amplitude of the waveform to unsatisfactory levels.

To overcome the problems associated with peak detection data recovery schemes, a different type of data recovery system was invented for use in recovering information encoded and stored in accordance with the widely-used double frequency recording code. A detailed description of this data recovery system is contained in U.S. Pat. No. 3,699,554, issued Oct. 17, 1972, and assigned to the assignee of the present invention. The circuitry disclosed in the referenced application includes circuits for integrating read waveforms over successive halves of data cells. The results of the integration are "dumped" to form sum signals representing the integral over a half cell period. The polarity of one sum signal for a data cell is compared to the polarity of the second sum signal for the same cell to determine whether a binary one or a binary zero had been recorded within the cell. Because the periods of integration (one half data cell) are relatively long, noise signals are overridden by the valid read waveform envelope. Moreover, the integrated signals are not significantly influenced by pulse crowding effects.

The integrating circuits used in the referenced data recovery system include separate RC charging circuits for accumulating charges over different halves of a data cell. The RC charging circuits are connected to a common connection with the source of the read signal waveform. Each of the capacitors is connected in parallel with a discharge circuit, such as a field effect transistor, which is gated by logic signals to discharge the capacitor at the end of the integrating period.

A field effect transistor or any other kind of electronic switch is an imperfect device with a certain inherent series resistance and inherent capacitance. Because prior art integrating circuits remain connected to the source of the read signal waveform during both integration and discharge periods, the input current flowing through the inherent series resistance of the field effect transistor at the end of the discharge period gives rise to an error voltage. The magnitude of this error voltage is a function of the field effect transistor series resistance, discrete resistances in the charging circuit and the magnitude of the read signal voltage.

Moreover, during the integration period, a second error voltage is introduced into the integrating circuit since the logic signal which controls the field effect transistor is capacitively coupled to the charging capacitor through the inherent capacitance of the field effect transistor.

SUMMARY OF THE INVENTION

To minimize the above-mentioned error voltages, an improved integrating circuit has been invented. The improved integrating circuit includes a selectively-energizable current source. The circuit further includes first and second transistors each of which has a first terminal connected to the current source, a second terminal which serves as an output terminal and a base terminal for receiving one of two input signals. Capacitors are connected between the second terminals of the transistors and a reference voltage terminal. The capacitors are connected in parallel with discharge means which selectively simultaneously connects the second terminals of the transistors to the reference voltage terminal to discharge the capacitors.

DESCRIPTION OF THE DRAWINGS

While the specification concludes with claims particularly pointing out and distinctly claiming that which is regarded as the present invention, details of one embodiment of the invention along with its further objects and advantages may be more readily ascertained from the following detailed description when read in conjunction with the accompanying drawings wherein:

DETAILED DESCRIPTION

Figure 1:
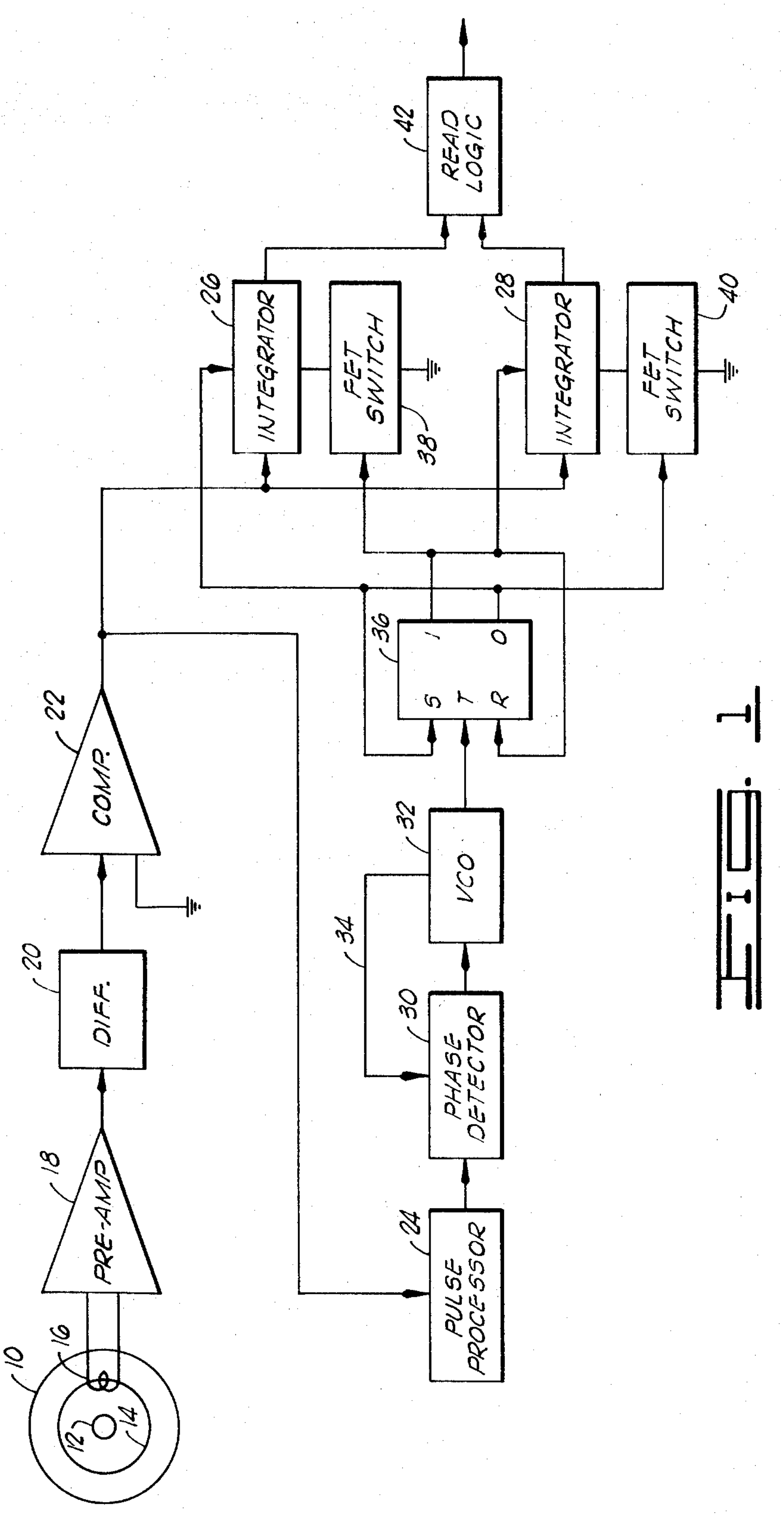
FIG. 1, a block diagram of a data recovery system for a disk drive, depicts the environment in which the present invention is used.

Referring to FIG. 1, one application for the present invention is a system for recovering data from a magnetic disk 10. The magnetic disk 10 rotates on a spindle 12 driven by a suitable motor, not shown. Information is stored on the surface of the disk 10 in concentric rings or tracks, only one track 14 of which is shown. Information is stored on these tracks either by reversing or leaving unchanged the polarity in discrete areas or spots in successively occurring data cells. Where the information is encoded in accordance with the well-known double frequency code, a binary 1 is recorded by establishing a flux reversal nominally at the center of a data cell. Where a binary 0 is to be recorded, no flux reversal is established within the data cell.

To recover inforamtion stored using a double frequency code, a transducer 16 is positioned adjacent the track from which data is to be recovered. Relative motion between the magnetic disk 10 and the transducer 16 causes the transducer to generate read signals which contain the recorded data. The polarity of the read signal is reversed whenever the transducer senses a flux reversal on the disk surface. Thus, the polarity of the read signal differs in the two halves of a cell in which a binary 1 is recorded but is the same in both halves of a cell in which a binary 0 is recorded.

The read signals generated by transducer 16 are applied to a preamplifier circuit 18 which amplifies the signals to a power level suitable for subsequent data recovery operations. The output of the preamplifier circuit 18 can be applied to a differentiator circuit 20. The output of the differentiator circuit 20 is applied to one input of a conventional comparator amplifier 22 having a second grounded input. One suitable amplifier circuit is described and shown in Pulse, Digital and Switching Waveforms by J. Millman and H. Taub, McGraw-Hill Book Co., 1965, in Figure 7–26, page 257. Whenever the level of the differentiated read signal appearing at the output of differentiator circuit 20 is at a lower level than the ground reference, the output of the comparator amplifier 22 is a low level signal. Conversely, whenever the output of the differentiator circuit 20 exceeds the ground reference, the output of the comparator amplifier 22 is a high level signal. The output of the comparator amplifier 22 is applied to a pulse processor 24 and to each of a pair of integrating circuits 26 and 28.

The pulse processor 24 shapes the pulses provided by comparator amplifier 22 before applying them to a phase detector 30. The output of phase detector 30 is transmitted to a voltage controlled oscillator 32 which, in one embodiment of the invention, generates an output signal having a frequency twice the repetition rate of the data cells on the disk track 14. The output signals generated by the voltage controlled oscillator 32 are transmitted through a feedback loop 34 to the phase detector 30. The phase detector 30 compares the phase of the signal from pulse processor 24 with the feedback signal to provide an error voltage to voltage controlled oscillator 32 representative of the difference in phase between those two signals. The output voltage causes the voltage controlled oscillator 32 to vary its output frequencies in close synchronism with the basic frequency of the read signals obtained from disk track 14. It should be understood that because of the phase relationships involved in voltage controlled oscillator loops, the oscillator 32 may include a built-in time delay to delay the output signal 90° in phase.

The output signals provided by voltage controlled oscillator 32 are also transmitted to a trigger (T) input terminal of a flip-flop circuit 36. The flip-flop circuit 36 is a conventional circuit having a set (S) input terminal, a trigger (T) input terminal, a reset (R) input terminal, a normal (1) output terminal and an inverse (0) output terminal. In a flip-flop of this type, a high or enabling signal applied to the set terminal simultaneously with an enabling signal at the trigger terminal causes the triggered flip-flop to assume its set state. In its set state, the normal output terminal of the flip-flop produces a high or enabling signal while the inverse output terminal produces a low or disabling signal. If an enabling signal is appliqd to the reset terminal simultaneously with an enabling signal at the trigger terminal, the flip-flop is driven to its reset state wherein the normal output terminal produces a disabling signal while the inverse output terminal produces an enabling signal.

The normal output terminal of the flip-flop 36 is fed back to the reset input terminal. The inverse output terminal is fed back to the set input terminal. The effect of these feedback connections is to cause the flip-flop 36 to alternate between its set and reset states each time a trigger pulse is applied to the trigger input terminal. Thus, flip-flop 36 changes states for each pulse produced by the voltage controlled oscillator 32 or twice for each data cell on the disk track 14. The change of states occur at the beginning of the first and second halves of each data cell.

The normal output of flip-flop circuit 36 is also applied to the integrating circuit 28 and to a field effect transistor switch 38 associated with the integrating circuit 26. The inverse output terminal of the flip-flop 36 is connected to the integrator 26 and to a field effect transistor switch 40 associated with the integrating circuit 28.

When the flip-flop circuit 36 is in its set state, integrating circuit 28 operates under the control of signals appearing at the output of the comparator amplifier 22. During the same time, the field effect transistor switch 38 is enabled to discharge the charging capacitor contained in integrating circuit 26. When the flip-flop circuit 36 is driven to its reset state, integrating circuit 26 begins to operate as a function of output signals from the comparator amplifier 22 while field effect transistor switch 40 operates to discharge capacitors in the integrating circuit 28.

The integrating circuits 26 and 28 perform an integration function over successive halves of a data cell. The signals resulting from the integrations are "dumped" near the end of the integration period to read logic circuits 42 in which the polarity of the signals are compared. If the polarity is the same, a binary 0 was recorded. If the polarity is different, a binary 1 was recorded. The details of the read logic circuits 42 are omitted from this application but appear in the earlier-mentioned U.S. Pat. No. 3,699,554.

Figure 2:
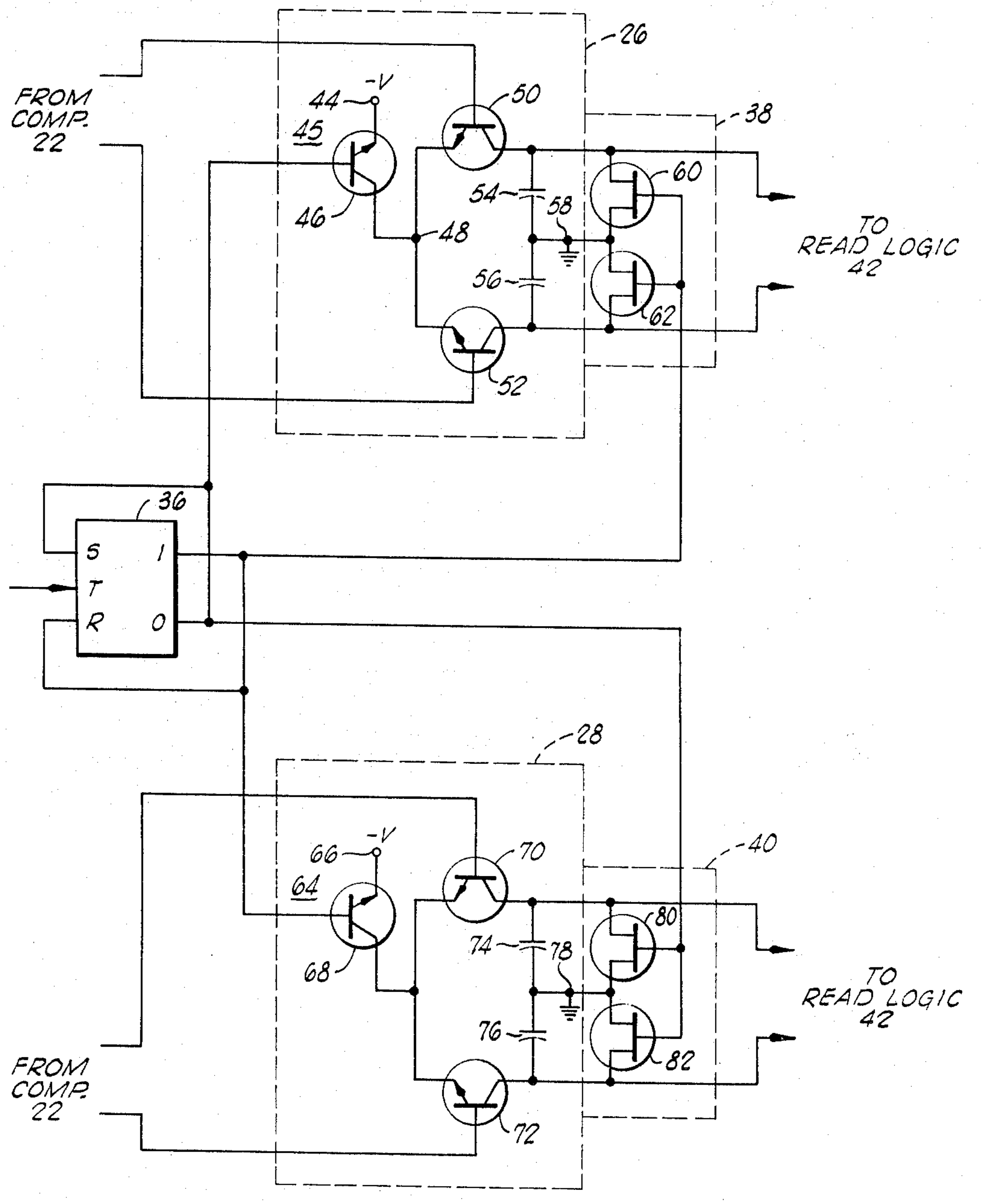
FIG. 2 is a more detailed schematic diagram of an improved integrating circuit constructed in accordance with the present invention.

Referring now to FIG. 2, flip-flop circuit 36 is shown in block diagram form while integrating circuit 26, integrating circuit 28, field effect transistor switch 38 and field effect transistor switch 40 are shown in more detailed schematic form. Except for the connections to flip-flop 36, the two integrating circuits and the two field effect transistor switches are identical.

Integrating circuit 26 includes a differential amplifier driven by a single selectively energizable current source 45 consisting of a negative voltage source 44 and an NPN transistor 46. The base terminal of transistor 46 is connected to the inverse output terminal of flip-flop circuit 36 while the collector terminal is connected to a junction 48. The differential amplifier also includes a first NPN transistor 50 and a second NPN transistor 52, each of which has its base terminal connected to a different output terminal from comparator amplifier 22. Transistors 50 and 52 should have substantially the same performance characteristics. The first or emitter terminals of the transistors 50 and 52 are connected to the junction 48 while the second or collector terminals are connected to terminals of a pair of charging capacitors 54 and 56 of equal size. The opposite terminals of the capacitors 54 and 56 are connected to a reference voltage terminal which, in FIG. 2, is shown to be a ground terminal 58.

The discharge means or FET switch 38 consists of a pair of matched field effect transistors 60 and 62 connecting the second terminals of the transistors 50 and 52 to the ground terminal 58. In the particular embodiment shown, the drain terminals of the field effect transistors 60 and 62 are connected to the collector terminals of transistors 50 and 52 respectively, the source terminals are connected to the ground terminal 58 and the gate terminals are connected in common to the normal output terminal of the flip-flop 36.

As mentioned earlier, the integrating circuit 28 is identical to the integrating circuit 26 except for the connections to the flip-flop circuit 36. Thus, integrating circuit 28 includes a selectively energizable current source 64 consisting of a negative voltage source 66 and an NPN transistor 68. The base terminal of the NPN transistor 68 is connected to the normal output terminal of the flip-flop circuit 36. The emitter terminal of transistor 68 is connected to a common junction of the emitter terminals of a pair of NPN transistors 70 and 72. The base terminals of the NPN transistors 70 and 72 are connected to the output of comparator amplifier 22 in the same manner as the base terminals of corresponding transistors in integrating circuit 26. The collector terminals of transistors 70 and 72 are connected to corresponding terminals on a pair of charging capacitors 74 and 76. The opposite terminals of capacitors 74 and 76 are connected to a common reference voltage or ground terminal 78.

The discharge means or FET switch 40 consists of a pair of field effect transistors 80 and 82, each of which is connected between the collector terminal of one of the transistors 70 and 72 and the ground terminal 78. The gate terminals for the field effect transistors 80 and 82 are connected to the inverse output terminal of flip-flop circuit 36.

The collector terminals of the transistors 50 and 52 in integrating circuit 26 serve as output terminals for signals to be applied to read logic circuit 42. Similarly, the collector terminals of the transistors 70 and 72 and integrating circuit 28 serve as output terminals through which integral signals can be applied to the read logic circuit 42.

The integrating circuits and FET switches described above operate in the following manner to provide a voltage representing the difference between the integrals of signals controlled by the two outputs from the comparator amplifier 22 during each half of a data cell. When the flip-flop 36 is in its set state, the enabling signal appearing on its normal output causes field effect transistors 60 and 62 in switch 38 to be triggered into a conductive state to provide discharge paths for the capacitors 54 and 56 in integrating circuit 26. Concurrently, the disabling signal on the inverse output terminal of the set flip-flop circuit 36 biases the transistor 46 of current source 45 into non-conduction to effectively open circuit the current source. Thus, while flip-flop circuit 36 is set, capacitors 54 and 56 discharge and are not subject to any charging current. Referring to integrating circuit 28, the enabling signal on the normal output of the set flip-flop 36 biases the transistor 68 in current source 64 into conduction to provide a driving current for the integrating circuit 28. At the same time, the disabling signal of the inverse output of flip-flop circuit 36, when applied to the gate terminals of the field effect transistors 80 and 82, allows those transistors to be non-conducting. The output signals from the comparator amplifier 22 are applied to the base terminals for the transistors 70 and 72 to control the conductivity of these transistors and thus the operation of integrating circuit 28. If the comparator amplifier 22 detects a differentiated read signal of a certain polarity, one of the outputs will be at a high level while the other will be at a low level. Under such conditions, transistor 70 theoretically is fully conductive while transistor 72 is theoretically nonconductive. If the comparator amplifier 22 detects a differentiated read signal of the opposite polarity, both outputs are at a low level. Both transistor 70 and transistor 72 are theoretically nonconductive under these conditions. While actual conduction through transistor 70 and 72 varies slightly from the theoretical levels, the charge which accumulates on capacitors 74 and 76 is primarily determined by the length of time during which the transistor 70 is fully conductive; i.e., the length of time during which the read signal has a certain polarity. Thus, the accumulated charge is indirectly in integration of the differentiated read signal applied to comparator amplifier 22. Capacitors 74 and 76 continue to accumulate charge as long as flip-flop 36 remains in its set state or for a period of one half data cell since the flip-flop 36 changes states only at the beginning and midpoints of data cells. The integrated voltages on capacitors 74 and 76 are sampled by or "dumped" into read logic circuits near the end of the half cell period.

When the flip-flop 36 is driven to its reset state by the next trigger pulse from voltage controlled oscillator 32, the disabling signal which appears on its normal output terminal biases the transistor 68 of integrating circuit 28 into non-conduction to cut off the drive current for the integrating circuit 28. Simultaneously, the enabling signal appearing on the inverse output terminal of flip-flop 36 triggers the field effect transistors 80 and 82 into conduction to provide discharge paths for the charge capacitors 74 and 76.

Concurrently, the current source 45 is energized by the enabling signal on the inverse output terminal of flip-flop circuit 36 to provide drive current for the integrating circuit 26. The field effect transistors 60 and 62 are disabled during this time by the disabling signal applied to their gate terminals from the normal output terminal of the flip-flop circuit 36. Thus, the capacitors 54 and 56 are charged as a function of the output of comparator amplifier 22 so long as the flip-flop 36 remains in its reset state. The integrated voltages on these capacitors are sampled by read logic circuit 42 near the end of the charging period.

Each of the integrating circuits 26 and 28 is designed to eliminate or at least minimize the error voltages common to earlier integrating circuits. Since each integrating circuit is driven by a selectively energizable current source which is turned off during the capacitor discharge time, voltage errors in prior art integrators resulting from resistive coupling of the continually applied read signal voltage are substantially eliminated. Voltage errors due to the capacitive coupling of logic voltages applied to field effect transistors are also minimized. Each field effect transistor has approximately the same stray capacitance, thus causing the same voltage feedthrough to each output terminal of the integrating circuit. Since in a preferred embodiment of the invention, the output terminals of the integrating circuits are connected to input terminals of voltage comparator amplifiers having excellent common mode rejection characteristics, the error due to capacitive voltage feedthrough is reduced to zero or near zero.

While there has been described what is presently thought to be a preferred embodiment of the present invention, variations and modifications will occur to those skilled in the art once they become familiar with the invention. For example, it would be within the ordinary skill in the art to use PNP transistors in place of the presently used NPN transistors. Obviously, the polarities of the voltage sources would have to be changed correspondingly. Since this and other changes will occur to those of ordinary skill in the art, it is intended that the appended claims shall be construed as including all such variations and modifications as fall within the true spirit and scope of the invention.

I claim:

1. A circuit for establishing an output voltage across a pair of output terminals representing the difference between two integrated voltages established under the control of first and second input signals comprising:

*a.* a selectively-energizable current source;

*b.* a first transistor having a first terminal connected to said current source, a second terminal serving as one output terminal and a base terminal for receiving the first input signal;

*c.* a second transistor having a first terminal connected to the first terminal of said first transistor, a second terminal serving as the other output terminal and a base terminal for receiving the second input signal;

*d.* a reference voltage terminal;

*e.* a first capacitor connected between the second terminal of said first transistor and said reference voltage terminal;

*f.* a second capacitor connected between the second terminal of said second transistor and said reference voltage terminal; and

*g.* discharge means for selectively simultaneously connecting said second terminals of said first and second transistors to said reference voltage terminal.

2. A circuit as recited in claim 1 wherein said discharge means further comprises:

*a.* a first field effect transistor having one terminal connected to the second terminal of said first transistor, another terminal connected to said reference voltage terminal and a gate terminal; and

*b.* a second field effect transistor having one terminal connected to the second terminal of said second transistor, another terminal connected to said reference voltage terminal and a gate terminal connected to the gate terminal of said first field effect transistor.

3. A circuit as recited in claim 2 further including logic means for energizing said current source while simultaneously biasing said field effect transistors into nonconduction to initiate an integration period and at a different time for de-energizing said current source while simultaneously biasing said field effect transistors into conduction to terminate an integration period.

4. For use in a data recovery system which produces an output signal indicative of binary information stored in a succession of cells on a magnetic medium by producing integrated voltages as functions of transduced electrical signals occurring during different halves of the cells and by comparing the polarity of the integrated voltage established during a first half cell period to the polarity of the voltage established during the second half cell period, first and second improved circuits for producing the integrated voltages, each of said circuits comprising:

*a.* a selectively-energizable current source for providing a driving current during one of the two half cell periods;

*b.* a first transistor having a first terminal connected to said current source, a second terminal serving as a circuit output terminal and a base terminal connected to one lead of a pair of input leads;

*c.* a second transistor having a first terminal connected to said current source, a second terminal serving as a second circuit output terminal and a base terminal connected to the other lead of a pair of input leads;

*d.* a reference voltage terminal;

*e.* a first capacitor connected between the second terminal of said first transistor and said reference voltage terminal;

*f.* a second capacitor connected between the second terminal of said second transistor and said reference voltage terminal; and

*g.* discharge means for selectively simultaneously connecting both of said second terminals to said reference voltage terminal during the other of the two half cell periods.

5. Improved circuits of the type described in claim 4 in further combination with:

*a.* a bistable logic device having a normal output terminal connected to the current source in the first of the improved circuits and to the discharge means in the second of the improved circuits and an inverse output terminal connected to the current source in the second of the improved circuits and to the discharge means in the first of the improved circuits; and

*b.* means for changing the state of the bistable logic device at the beginning of successive half cell periods.

6. An improved circuit of the type described in claim 5 wherein the discharge means in each of said first and second improved circuits further comprises:

*a.* a first field effect transistor having one terminal connected to the second terminal of said first transistor, another terminal connected to said reference voltage terminal and a gate terminal connected to an output terminal of said logic device; and

*b.* a second field effect transistor having one terminal connected to the second terminal of said second transistor, another terminal connected to said reference voltage terminal and a gate terminal connected to the gate terminal of said first field effect transistor.

7. An improved integrating circuit of the type described in claim 6 wherein said bistable logic device comprises a flip-flop circuit having a trigger input terminal, a set input terminal, a reset input terminal, a normal output terminal, an inverse output terminal, means connecting the normal output terminal to the reset input terminal and the inverse output terminal to the set input terminal, whereby said flip-flop changes states each time a pulse is applied to the trigger input terminal.

8. An improved circuit of the type described in claim 5 wherein said selectively-energizable current source comprises:

*a.* a voltage source; and

*b.* a source transistor having a first terminal connected to the voltage source, a second terminal connected to the first terminals of said first and said second transistors, and a base terminal connected to an output terminal of said logic device.

* * * * *